United States Patent
Heiskanen et al.

(10) Patent No.: US 9,708,772 B2
(45) Date of Patent: Jul. 18, 2017

(54) METHOD OF PROVIDING FIBER WEB MAKING FURNISH WITH FILLER, AND PAPER OR PAPER BOARD

(71) Applicants: WETEND TECHNOLOGIES OY, Savonlinna (FI); STORA ENSO OYJ, Helsinki (FI)

(72) Inventors: Isto Heiskanen, Imatra (FI); Olavi Imppola, Hyvinkaa (FI); Jouni Matula, Savonlinna (FI); Jussi Matula, Savonlinna (FI); Jari Rasanen, Imatra (FI); Karri Tahkola, Savonlinna (FI); Matti Vakevainen, Imatra (FI)

(73) Assignees: Wetend Technologies Oy, Savonlinna (FI); Stora Enso Oyj, Helsinki (FI)

(*) Notice: Subject to any disclaimer, the term of this patent is extended or adjusted under 35 U.S.C. 154(b) by 0 days.

(21) Appl. No.: 14/786,124

(22) PCT Filed: Apr. 25, 2014

(86) PCT No.: PCT/FI2014/050299
§ 371 (c)(1),
(2) Date: Oct. 21, 2015

(87) PCT Pub. No.: WO2014/174155
PCT Pub. Date: Oct. 30, 2014

(65) Prior Publication Data
US 2016/0060813 A1    Mar. 3, 2016

(30) Foreign Application Priority Data
Apr. 26, 2013 (FI) .................................. 20135433

(51) Int. Cl.
*D21H 21/18* (2006.01)
*D21H 17/63* (2006.01)
(Continued)

(52) U.S. Cl.
CPC .......... *D21H 21/18* (2013.01); *C01F 11/181* (2013.01); *C01F 11/182* (2013.01);
(Continued)

(58) Field of Classification Search
CPC ...... D21H 17/675; D21H 17/70; D21H 17/67; D21H 17/63; D21H 17/64; D21H 17/25;
(Continued)

(56) References Cited

U.S. PATENT DOCUMENTS 8,852,402 B2 * 10/2014 Imppola ................. D21H 17/70
162/181.2
9,181,103 B2 * 11/2015 Imppola ..................... C01F 11/02
(Continued)

FOREIGN PATENT DOCUMENTS

CN    101479427 A    7/2009
CN    101970751 A    2/2011
(Continued)

OTHER PUBLICATIONS

International Search Report cited in PCT/FI2014/050299 mailed Aug. 14, 2014, three pages.
Finnish Search Report dated Feb. 21, 2014, one page.

*Primary Examiner* — Jose Fortuna
(74) *Attorney, Agent, or Firm* — Nixon & Vanderhye P.C.

(57) ABSTRACT

The present invention relates to a method of producing precipitated calcium carbonate (PCC) where a retention/strength enhancing chemical is added to milk of lime to form a mixture thereof prior to adding the mixture of the retention/strength enhancing chemical and milk of lime to paper making stock in a pipeline leading to a headbox of a paper making machine, whereafter carbon dioxide is introduced to the paper making stock, and the carbonation reaction
(Continued)

between milk of lime and carbon dioxide is allowed to proceed in the presence of both fibers and the retention/strength enhancing chemical.

15 Claims, 2 Drawing Sheets

(51) Int. Cl.
  *D21H 17/70* (2006.01)
  *D21H 17/67* (2006.01)
  *D21H 17/00* (2006.01)
  *D21H 21/10* (2006.01)
  *D21H 23/04* (2006.01)
  *C01F 11/18* (2006.01)
  *D21H 17/37* (2006.01)

(52) U.S. Cl.
  CPC ......... *D21H 17/375* (2013.01); *D21H 17/63* (2013.01); *D21H 17/675* (2013.01); *D21H 17/70* (2013.01); *D21H 17/73* (2013.01); *D21H 17/74* (2013.01); *D21H 21/10* (2013.01); *D21H 23/04* (2013.01); *C01P 2004/03* (2013.01); *C01P 2004/62* (2013.01)

(58) Field of Classification Search
  CPC ...... D21H 17/28; D21H 17/375; D21H 17/66; D21H 17/73; D21H 17/74; D21H 21/10; D21H 21/18; D21H 23/04
  See application file for complete search history.

(56) References Cited

U.S. PATENT DOCUMENTS

| | | | | |
|---|---|---|---|---|
| 2010/0120945 A1* | 5/2010 | Sahlberg | ................ | C09C 1/021 523/353 |
| 2011/0011548 A1* | 1/2011 | Matula | ................ | C01F 11/181 162/181.4 |
| 2013/0139987 A1* | 6/2013 | Silenius | ................ | D21H 17/67 162/175 |
| 2015/0299959 A1* | 10/2015 | Axrup | ................ | C08K 3/26 162/181.4 |
| 2015/0315748 A1* | 11/2015 | Imppola | ................ | D21H 11/18 162/157.7 |
| 2016/0040361 A9* | 2/2016 | Klungness | ............ | D21C 9/004 162/181.2 |
| 2016/0060813 A1* | 3/2016 | Heiskanen | ............ | D21H 17/63 162/168.3 |

FOREIGN PATENT DOCUMENTS

| | | | | |
|---|---|---|---|---|
| CN | 102811801 A | 12/2012 | | |
| DE | 10 2007 029 688 A1 | 1/2009 | | |
| FI | EP 0521737 A1 * | 1/1993 | ............ | C09D 17/004 |
| FI | WO 2009083633 A1 * | 7/2009 | ............ | B82Y 30/00 |
| WO | 03/033815 A2 | 4/2003 | | |
| WO | 2008128595 A1 | 10/2008 | | |
| WO | 2009000345 A1 | 12/2008 | | |
| WO | 2009000346 A1 | 12/2008 | | |
| WO | 2009103853 A2 | 8/2009 | | |
| WO | 2009103854 A2 | 8/2009 | | |
| WO | 2011110742 A1 | 9/2011 | | |
| WO | 2011151525 A1 | 12/2011 | | |

\* cited by examiner

METHOD OF PROVIDING FIBER WEB MAKING FURNISH WITH FILLER, AND PAPER OR PAPER BOARD

CROSS RELATED APPLICATION

This application is the U.S. national phase of International Application No. PCT/FI2014/050299 filed 25 Apr. 2014 which designated the U.S. and claims priority to Finnish Patent Application No. 20135433 filed 26 Apr. 2013, the entire contents of these applications are incorporated by reference.

TECHNICAL FIELD

The present invention relates to the manufacture of PCC (Precipitated Calcium Carbonate) in the fiber web making furnish and paper or paper board using the PCC as filler. The present invention relates especially to the preparation of calcium carbonate and introduction of strength enhancing or retention chemicals to the paper or paper board making stock.

BACKGROUND ART

Paper and paper board are manufactured of a fiber suspension, so called paper making stock or furnish, by draining water from the fibrous suspension through a wire or wires of a paper or board making machine. The stock may comprise a number of fibrous components, like for instance chemical pulp, chemimechanical pulp, mechanical pulp, and recycled pulp, and various additives, like fillers, retention aids, sizing agents, paper dyes, wet-strength and dry-strength enhancing chemicals, just to name a few.

Fillers are usually finely divided mineral products, normally in the size range of about 0.5 to 5 micrometers. The main function of the fillers is to reduce materials cost per unit mass of paper as the fillers are considerably cheaper than papermaking fibres, other functions are to increase opacity and to increase smoothness of the end product. The type of paper or board to be produced has a huge effect on the choice of filler, blends of fillers, and their level in the product. The most important fillers are calcium carbonate and kaolin clay aka calcined kaolin. Most fillers are delivered to paper mills either as dry powders or as slurries. One form of calcium carbonate, i.e. Precipitated Calcium Carbonate (PCC) is often prepared at a plant adjacent to the paper mill, on-site, and delivered to the paper machine as a slurry. Lately, an in-line production of PCC has been successfully tested in mill-scale applications. By the in-line production of PCC is meant a process in which the carbonation of the milk of lime (MOL) is performed by means of pure carbon dioxide or carbon dioxide containing gas in the presence of the stock in the pipeline taking the stock or furnish to the headbox of the paper or board machine.

The milk of lime may be produced by calcining limestone (calcium carbonate) at high temperature to drive off $CO_2$, and slaking the resulting lime (calcium oxide) by addition of water to form a lime suspension (calcium hydroxide).

A downside in the use of fillers relates to the fact that while, as mentioned already above, the fillers increase the opacity, which is a desired feature of paper or board, the fillers also reduce the strength of paper or board. Thus, the paper manufacturer has to find a balance between opacity and strength. One way to maintain good product strength with good optical properties is to use high quality fillers. A good example of high quality fillers is calcined kaolin, which is an anhydrous aluminium silicate produced by heating ultra fine natural kaolin to high temperatures in a kiln. In the calcinations process, the water of hydroxylation is first driven off as vapour at temperatures of 500-700° C. Then heating is continued up to 1000° C. where ultra fine particles begin to agglomerate into larger particles. The final result is kaolin—air interfaces with a relatively large internal pore volume. After the calcination, clay is pulverized to remove any oversized agglomerates. The end product typically has a very narrow particle size distribution. Calcined kaolin is defined as specialty filler and is mainly applied in order to increase light scattering and opacity and also to reduce potential ink print through. However, the average price level of calcined kaolin is about 3-fold compared to PCC. In practice this means that the paper manufacturer could use three times more PCC than calcined kaolin. However, such a high increase in the use of PCC would inevitably mean drastic reduction in paper strength.

A further downside in the use of fillers is that they tend to interfere with inter-fiber bonding, reducing the strength of paper. Another downside is the tendency of small-sized fillers to pass the paper machine wire and end up in the filtrate. Filler retention is a term describing the proportion of the fillers remaining in the web on the wire. The lower the value is the weaker is the retention. A further downside is the tendency of the fillers to form agglomerates decreasing the quality of the paper. Thus there are a few traditional rules for the use of fillers, i.e. (a) making sure that the filler material is fully dispersed into individual particles before it is added into the paper making stock or furnish. Sometimes a specific chemical, i.e. dispersant, is used for the above purpose. (b) mixing it with the furnish at a location that does not adversely affect other additives, and (c) retaining it in the fiber mat on the paper machine wire. The first and the last goal may sometimes be in conflict with each other, especially if a large amount of dispersant has been used to create a stable suspension. Also, it is obvious that the finer material the filler is the more easily it will be filtered out of the web and wire, and the weaker is the retention. To improve the retention the furnish is provided with retention agent/s for flocking the filler to the fibres and other solids in the furnish. From the above it should be understood that further chemicals, like dispersants, strength enhancing chemicals and retention aids are in everyday use for facilitating the increased use of fillers.

Further, chemicals enhancing the strength of paper, i.e. internal bond, burst strength, tensile strength etc. are also used and they include various natural and man-made or synthetic polymers. One of the most widely used strength enhancing chemical is starch. The starch may be based on any raw material, e.g. potato, maize, wheat, tapioca, rice, corn, waxy maize or waxy corn. Carboxymethyl cellulose (CMC) and guar gum derivatives are the most popular natural polymers.

PAAE (Polyamideoamine-epichlorohydrin), c-PAM (cationic polyacrylamine polymer), a-PAM (anionic PAM), silicate, nanoparticles, copolymer of polyvinylamine and polyacrylate (PA), anionic copolymers of acrylamide or other acrylamide polymer are widely used examples of the synthetic strength enhancing chemicals.

The distinction between retention chemicals and strength enhancing chemicals is, in practice, negligible, as the working principle of both chemicals is the same, and they are introduced into the furnish at about the same time, i.e. to the furnish upstream of the headbox of the paper machine WO-A1-2007/067146 discusses a method of producing on-site precipitated calcium carbonate (PCC) for use as a filler in paper or paper board production, wherein the carbonation of calcium hydroxide is performed in the presence of starch. The precipitated calcium carbonate produced by the above described method and when used as filler decreases the dusting tendency of the paper and increases the strength of the paper or paper board. It is believed that the above results are due to the starch binding the small-scale filler particles such that they are not loose in the paper, and cannot, thus, cause dusting. In the process discussed in the WO document the PCC is produced on-site as the presence of fibres and fines are believed to disturb the incorporation of starch in the PCC particles. The PCC-starch mixture is transported for use at the paper mill by means of pumping or by means of a tank truck.

U.S. Pat. No. 2,188,494, U.S. Pat. No. 3,443,890 and U.S. Pat. No. B1-6,294,143 discuss basically similar methods of manufacturing PCC in the presence of starch or, in broader sense, in the presence of carbohydrates.

Yet, when considering the production of PCC in the presence of starch, or carbohydrates, discussed in prior art publications, for instance the above mentioned WO document teaches that the precipitated calcium carbonate is most preferably not produced in the presence of fibers, since fibers and fines can disturb the incorporation of the starch and/or the carboxy methyl cellulose in the PCC particles. Moreover, the production of precipitated calcium carbonate separated from the paper-making process, i.e. not in-situ during paper-making, makes it easier to control the process. In other words, in prior art there is a clear prejudice that starch loses its ability to bond to PCC particulates when fibers or fines are present, whereby it could be expected that, in order to ensure sufficient bonding to fibres, i.e. for improving the retention of PCC, and strength of paper or board, an overdose of retention/strength enhancing chemical should be used.

WO-A2-2009103853 discusses introduction of thick stock components into the furnish by means of an injection mixer. The document also suggests that while injecting thick stock also chemicals, like milk of lime could be introduced together with a thick stock component. The document further teaches the introduction of milk of lime and carbon dioxide into the furnish prior to the headbox screen and the retention chemical together with fine fraction of the fiber recovery filter after the headbox screen such that the precipitation of PCC has taken place prior to the injection of the retention chemical. The document discusses further how various additives may be mixed beforehand with a thick stock component i.e. prior to injecting the thick stock component in the furnish.

WO-A2-2009103854 discusses precipitation of PCC in the short circulation of a fiber web machine. The document suggests introducing all or at least substantially all chemicals needed in the manufacture of a fiber web after the precipitation of PCC into the furnish.

DE-A1-102007029688 discusses methods of producing PCC for the paper manufacture. The document teaches the preparation of PCC in a separate reactor in which water, milk of lime, carbon dioxide and nuclei for crystallization are introduced. The document teaches that as the nuclei, fines, fine impurities, retention agent, starch, etc. may be used. After the PCC is precipitated the suspension is introduced to be mixed with the fibrous constituents of the furnish, i.e. paper making fibers, for instance. Thus the document teaches in the manner of earlier discussed WO-A1-2007/067146, the precipitation of PCC in the presence of, among other options, starch or retention chemical. However, the discussed method has a few drawbacks. Firstly, allowing the PCC crystals to precipitate on the fines, fine impurities etc. lead to small-sized particles that are relatively inactive and apt to being filtered in the white water in the paper manufacture unless being bonded to the fibers by retention chemicals added later on in the furnish. And secondly, if the nuclei are comprised of retention chemical molecules, the molecules will be, during the precipitation reaction, surrounded by the PCC crystals such that the molecules have no or at least very little free surface for attaching to the fibers when, later on, getting into contact with such.

Thus the main problems with the prior art are

High investment, energy, running and maintenance costs involved in the PCC production in an on-site facility, Increased use of high quality expensive fillers if both high opacity and strength are required, Increased use of retention/strength enhancing chemical if both high opacity and strength are required, and Uneven homogeneity of the PCC crystals.

BRIEF SUMMARY OF THE INVENTION

An object of the present invention is to develop a novel method of producing PCC, which avoids at least some of the problems discussed in connection with the above prior art methods.

A further object of the present invention is to develop a novel method of manufacturing PCC in the presence of a retention/strength enhancing polymer.

A yet further object of the present invention is to develop a novel way of providing paper or paper board, more generally fiber web, with high opacity without a need to use expensive high quality fillers.

A still further object of the present invention is to develop a novel method of manufacturing PCC by means of which the retention of PCC/filler in the fiber web is increased.

A still further object of the present invention is to develop a novel method of manufacturing PCC by means of which the strength properties of the fiber web are improved.

A still further object of the present invention is to develop a novel method of manufacturing PCC by means of which the proportion of the filler in the fiber web is increased.

A still further object of the present invention is to develop a novel method of manufacturing PCC by means of which the need for strength enhancing/retention chemical is reduced.

At least one of the above objects has been achieved in the present invention by a method of providing fiber web making furnish with filler comprising the steps of a) Providing a pipeline leading to a headbox of a fiber web machine with furnish, b) Making the furnish comprising fiber web making fibres flow towards the headbox, c) Introducing at least one retention/strength enhancing chemical simultaneously together with milk of lime to the furnish, d) Providing the furnish with $CO_2$ before, during or after step c), and e) Allowing carbonation reaction between milk of lime and carbon dioxide to proceed in the presence of both fiber web making fibres and the at least one retention/strength enhancing chemical.

At least one of the above-mentioned objects is achieved by means of using the thus produced PCC in the manufacture of a fiber web.

The other characterizing features of the present invention will become clear in the appended claims.

Advantages obtained by the method in accordance with the present invention over the prior-art methods are for example:
- the quality of the PCC produced with the in-line method is far better and homogenous than any other way of producing calcium carbonate filler, including the PCC production outside the paper machine,
- the investments required by PCC production are reduced by at least half compared with previously used on-site or satellite plants,
- the PCC production energy costs are reduced to about one tenth when compared with the previous PCC production,
- the consumption of clean water is substantially reduced, when compared with on-site PCC processes in accordance with prior art,
- paper production requires less or no retention chemicals,
- in the paper production higher amount of fillers than previously may be used, thereby saving the use of expensive fibre material,
- in the paper production lower quality fillers than previously may be used, thereby creating savings in the filler related expenses,
- the need for hydrophobic glue and retention aids is reduced,
- the papermaking water cycles become cleaner and/or the need for purification chemicals is reduced, and water cycles may be closed more than previously—improved runnability, and
- Easy to control the in-line system online

BRIEF DESCRIPTION OF THE FIGURES

The method of manufacturing PCC and its use in the manufacture of fiber web are discussed in more detail in connection with the following examples and images of which.

DETAILED DESCRIPTION OF THE INVENTION

Figure 1:
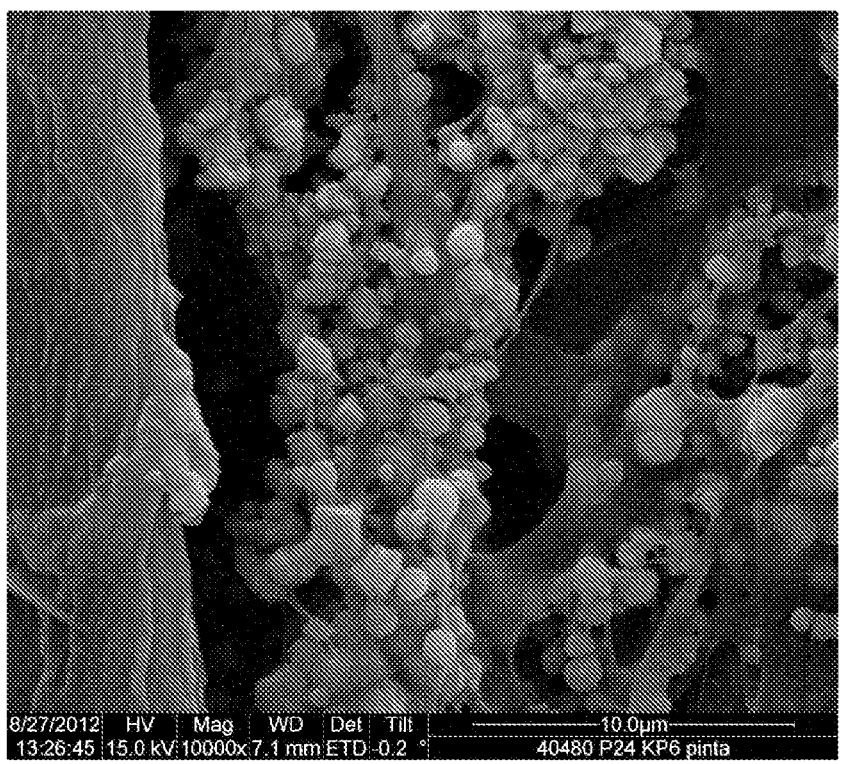
FIG. 1 illustrates a SEM image of a hand sheet manufactured by using in-line PCC and starch.

Due to the various drawbacks in the in-situ production of PCC in the presence of strength enhancing/retention chemical (but without the presence of paper/board making, more generally, fiber web making fibers) it was decided to study the in-line production of PCC, i.e. production of PCC in the presence of both fibres and strength enhancing/retention chemical. If such a production would prove to be competitive with the on-site process in view of the quality of PCC, retention of PCC in the fibre suspension, and the consumption of the strength enhancing/retention chemical, at least some of the various drawbacks and problems involved in the in-situ process could be put aside.

Example 1

A number of experiments were performed for studying the retention of the PCC in the stock while utilizing various ways of introducing PCC and strength enhancing or retention polymer in the stock. The tested stocks were as follows:

In experiment 1, sample 1, i.e. the reference stock, was ECF-bleached (elemental chlorine free) non-dried and non-refined sulphate birch pulp having a consistency of about 1 percent that corresponds to ordinary paper machine headbox consistency. 500 g of pulp was poured in a laboratory mixer having a bottom formed of a wire and below the bottom a valve and a filtrate conduit for draining filtrate out of the sample. In the mixer was also added traditional, i.e. produced on-site but not in-line, PCC slurry, the amount of added PCC was adjusted to correspond to an ordinary filler amount of 28% in dried fine paper. The pulp and the PCC were agitated for 60 seconds at a speed of 250 rpm, whereafter the rotor speed was raised to 500 rpm for 30 seconds. The shear forces created by the rotor of the mixer at a speed of 500 rpm correspond to the shear forces in the short circulation and headbox of a paper machine. After the 30 seconds the valve at the bottom of the mixer was opened, and the agitation was continued for another 30 seconds during draining filtrate out of the pulp. The filtrate recovered from the mixed and filtered sample was combusted to find out the filler content Ff in the filtrate.

To determine the filler retention, i.e. the amount of PCC retained in the web on the wire, another equal sample was prepared in a similar method, i.e. mixing with the mixer for 60 seconds/250 rpm and for 30 seconds/500 rpm, and combusted to find out its filler content Fp. The filler retention Fret is calculated by using the following equation $$Fret=100*(Fp-Ff)/Fp$$

In experiment 2, for sample 2, the same basic stock as in experiment 1 was used, i.e. bleached non-dried and non-refined soft wood pulp having a consistency of about 1 percent. The PCC was carbonated by an in-line method in a carbonation reactor to the sample having a consistency of 1%. Both pulp and milk of lime were poured in the carbonation reactor, the reactor was closed and filled with a stoichiometric (in relation to milk of lime) amount of $CO_2$. The contents of the reactor was vigorously agitated for 2 seconds (0.5 seconds for accelerating the rotor speed to 2660 rpm, one second for maintaining the speed and 0.5 seconds for decelerating the rotor speed to 0 rpm) so that the calcium hydroxide of the milk of lime reacted with $CO_2$ and was crystallized to calcium carbonate. The total amount of milk of lime and $CO_2$ were calculated beforehand so that the final amount of PCC in the stock corresponded to ordinary filler amount of 28% in dried fine paper.

Thereafter one part of the sample having a weight of 500 g was combusted to find out the ash content Fp of the pulp or stock, and another part of the sample having a weight of 500 g was poured in the laboratory mixer discussed in Example 1. The agitation with a speed of 500 rpm was initiated and after 25 second of mixing strength enhancing/retention polymer was added, the amount corresponding to traditional amount of 3 kg/ton of pulp. The retention chemical was cationic polyacrylamide (c-PAM=cationic polyacrylamine polymer). After 5 seconds of mixing with c-PAM the valve at the bottom of the mixer was opened, and the agitation was continued for another 30 seconds for draining filtrate out of the pulp. Next the agitation was stopped and the filtrate was combusted to find out its ash content Ff, i.e. the amount of filler passed through the wire. The filler retention Fret was calculated as discussed in experiment 1.

In experiment 3, for sample 3, the same basic stock as in experiment 1 was used, i.e. bleached non-dried and non-refined soft wood pulp having a consistency of about 1 percent. Pulp was poured in the carbonation reactor. To the milk of lime was added retention/strength enhancing polymer (c-PAM) 0.3% of dry $CA(OH)_2$, the amount of c-PAM corresponding to 225 g per ton of pulp, whereafter the milk of lime-polymer mixture was poured in the carbonation reactor. Next, the PCC was carbonated by an in-line method in the carbonation reactor by closing the reactor and filling it with stoichiometric amount of $CO_2$. The contents of the reactor was vigorously agitated for 2 seconds (0.5 seconds for accelerating the rotor speed to 2660 rpm, one second for maintaining the speed and 0.5 seconds for decelerating the rotor speed to 0 rpm) so that the calcium hydroxide of the milk of lime reacted with $CO_2$ and was crystallized to calcium carbonate. The amount of milk of lime and $CO_2$ were calculated beforehand so that the final amount of PCC corresponded to ordinary filler amount of 28% in dried fine paper.

Thereafter one part of the sample having a weight of 500 g was combusted to find out the ash content Fp of the pulp, and another part of the sample having a weight of 500 g was poured in the laboratory mixer discussed in Example 1. The agitation with a speed of 500 rpm was initiated and after 30 second of mixing the valve at the bottom of the mixer was opened, and the agitation was continued for another 30 seconds for draining filtrate out of the pulp. Next the agitation was stopped and the filtrate was combusted to find out its ash content Ff, i.e. the amount of filler passed through the wire. The filler retention Fret was calculated as discussed in experiment 1.

In experiment 4, for sample 4, the same basic stock as in experiment 1 was used, i.e. bleached non-dried and non-refined soft wood pulp having a consistency of about 1 percent. Pulp was poured in the carbonation reactor. To the milk of lime was added retention/strength enhancing polymer (c-PAM) 1.0% of dry $CA(OH)_2$, the amount of c-PAM corresponding to 750 g per ton of pulp, whereafter the milk of lime-polymer mixture was poured in the reactor. The PCC was carbonated by an in-line method in a carbonation reactor to the sample and the same procedures were carried out as in example 3 to find out the filler retention.

Table 1 discusses the experiments performed when testing the novel process of manufacturing PCC in the presence of both strength enhancing polymer or retention polymer.

TABLE 1

| Example | Polymer | Polymer, g/ton | Filler Retention, % |
|---|---|---|---|
| 1 | 0 kg/t | 0 | 28 |
| 2 | 3 kg/t | 3000 | 41 |
| 3 | 0.3% | 225 | 37 |
| 4 | 1.0% | 750 | 39 |

The results of the experiments 1-4 show that by adding the strength enhancing/retention polymer in the milk of lime and allowing the crystallization of the PCC take place in the presence of both the fibers and the polymer (examples 3 and 4), the amount of polymer may be significantly reduced. To be more specific, it was learned that carbonation of PCC in the presence of 0.3% strength enhancing/retention polymer (calculated from the amount of dry $CA(OH)_2$) was capable of increasing the filler retention about 11 percentage units compared to the carbonation of PCC without the use of a polymer at all, and that, thereafter, more than tripling the polymer amount to 1.0% the filler retention was further increased by just about two percentage unit compared to the 0.3% addition of polymer. Further, the table shows that a 4-fold dosage of polymer (3000 g) with the use of on-site PCC (PCC not carbonated in the presence of the polymer and fibers) resulted to retention of 41%, i.e. only 2 percentage units higher (than with the dosage of 750 g together with milk of lime). In practice, this means that a huge improvement in retention may be gained by carbonating the PCC in the presence of a small amount of strength enhancing/retention polymer. Further, it looks like the amount of strength enhancing/retention polymer may be reduced significantly (in the experiments to about one tenth of its traditional dosage) without losing much filler retention. Naturally, the above is also a clear indication that performing the carbonation of PCC in accordance with the present invention, a multifold amount of PCC may be retained in and on the fibers and fibrils by a certain dosage of the retention polymer compared to traditional methods (examples 1 and 2. However, it has to be understood that the above values in Table 1 are only indicative, and cannot be considered exact values. For instance, as the pulp, and especially its dilution liquid, included an unknown amount of filler material, i.e. ash. Thereby the accuracy of the experiments is +/−2%.

Based on the above results it was assumed that the higher the retention is, the stronger and the more stable the PCC-fiber composite is and the better strength properties the paper manufactured of such furnish is. For studying the above assumption another series of tests were performed.

Example 2

The other series of experiments were performed for comparing the strength properties of paper made by using, on the one hand, calcined kaolin and, on the other hand, several variants of in-line PCC as the filler. In the experiments using in-line PCC three different PCC variants were tested, i.e. PCC without additional retention/strength enhancing chemicals, PCC carbonated in the presence of starch and PCC carbonated in the presence of starch and CMC applied together with calcined kaolin. For the majority of the experiments the PCC concentration was set to 6%.

The second series of experiments were performed such that, first, a reference point was produced by manufacturing with the use of a pilot paper machine a hand sheet with a standard stock recipe (highly refined bleached birch pulp) for modeling the top surface layer of an uncoated multilayer liquid packaging board. A number of variables were measured or determined by using the hand sheet. The recipe used in experiment 5 for defining the reference point included 5% calcined kaolin (calculated from the weight of dry furnish) as the filler for improving the whiteness and opacity of the hand sheet.

After attaining the reference point, i.e. in experiment 6, the calcined kaolin was replaced by 6% in-line PCC, i.e. PCC produced in-line to the paper making stock or furnish. In this way a comparison between paper or board made by traditional filler application method with the paper or board manufactured by using the in-line PCC application method may be made.

In experiment 7 the PCC was produced in-line to the paper making stock such that its concentration was 6%. However, in this experiment (Exp. 7) cationic starch, 10% of total filler volume was added to milk of lime prior to the carbonation of the PCC in the presence of fibres.

In experiment 8 the filler was produced to the paper making stock such that its total concentration was 7.5%. The filler comprised 3% in-line PCC, 2% calcined kaolin with 4% cationic starch and 2% CMC mixed with the calcium hydroxide, i.e. milk of lime prior to the carbonation of the PCC. The starch and CMC percentages refer to total filler volume.

For each experiment 5-8 pulp of dry matter content of 0.5% was used. The solution containing milk of lime was injected into the pulp by means of a syringe just before the carbonation process. The carbonation and mixing were completed in a Quantum Mark IV laboratory mixer. Hand sheets were prepared using a moving belt former (MBF), which is designed to simulate the water removing conditions of a paper machine while forming the sheet. Hand sheets were pressed and drum dried according to the SCAN-C 26:76 standard. The target grammage of the prepared hand sheets was 65 g/m² and the size of the sheets 190 mm×190 mm. Scanning Electron Microscope (SEM) images of the produced hand sheets were also taken for comparison purposes.

Table 2 shows the most important strength properties of the hand sheets of Example 2. In the strength values both machine and cross machine directions were taken into account by calculating a geometrical average of those values. What is remarkable is that there is a clear improvement in all strength properties when going from experiment 5 to experiment 6, i.e. from the use of calcined kaolin to the use of in-line PCC. In other words, already the carbonation of PCC in the presence of fibers improves the bonding between the filler particles and the fibers. The tensile strength and tensile index have improved about 10%, and the tensile stiffness values more than 20%. Only the stretch has remained substantially the same.

Also when going from experiment 6 to experiment 7 i.e. from mere in-line PCC to in-line PCC carbonated in the presence of cationic starch the strength properties show a clear increase. This kind of a result may be considered to be, in a way, opposite to the teaching of the WO-A1-2007/067146, which indicated that the fibers and fines disturb the incorporation of polymer to the PCC particles. Tensile stress has improved about 6%, tensile index almost 10%, whereas the stiffness values have remained substantially the same.

TABLE 2

| Experiment | Unit | Exp. 5 | Exp. 6 | Exp. 7 | Exp. 8 |
|---|---|---|---|---|---|
| Tensile strength, Geom.avg. md + cd | kN/m | 2.8 | 3.2 | 3.4 | 3.6 |
| Stretch, Geom.avg. md + cd | % | 3.1 | 3.2 | 3.4 | 3.5 |
| Tensile index, Geom.avg. md + cd | Nm/g | 44.9 | 48.5 | 53.2 | 53.5 |
| Tensile stiffness, Geom.avg. md + cd | kN/m | 298 | 390 | 384 | 380 |
| Tensile stiffness index, Geom.avg. md + cd | MNm/kg | 4.7 | 6.0 | 5.9 | 5.7 |

When going to more complicated filler recipe to experiment 8 the changes from experiment 7, i.e. the in-line PCC produced in the presence of starch and CMC, are relatively small. Some values show slight improvement and some slight reduction. Thereby it may be considered that starch in combination with CMC works as well as starch alone, whereby also a combination of retention/strength enhancing chemicals may be used.

TABLE 3

| Measured Variable | 6% in-line PCC + 10% cationic starch (Exp. 7) | 3% in-line PCC + 2% calcined kaolin + 4% starch + 2% CMC (Exp. 8) |
|---|---|---|
| Opacity | ○ | ○ |
| Stretch | + | + + |
| Tensile index | + + | + + |
| Tensile stiffness index | + + + | + + + |
| E-modulus | + + + | + + + |
| Tensile energy absorption index | + + + | + + + |
| Tear strength | + | + + |
| Tear index | + | + |
| Burst strength | + + + | + + + |
| Burst index | + + | + + |

Table 3 compares the properties of hand sheets of experiments 7 and 8 to that of experiment 5 by using a few more additional properties. In table 3 '+++' designates improvement of 20% or more, '++' improvement between 10 and 20%, '+' improvement between 3 and 10%, and '0' values between −3% and +3%. The minuses designate corresponding reductions in the value of the property. Thus, the values of all strength properties have been improved; most values more than 10%. What is noteworthy is that the opacity has remained substantially the same. In other words, the performed experiments 5-8 evidence that the amount of filler (cheap PCC) could be increased if the target were to maintain the existing paper strength, i.e. in the strength properties there is some room for decrease. This would, on its part, mean that in the end product expensive fibers could be replaced with affordable filler (PCC), whereby the price level of the end product could be reduced.

Example 3

Yet another series of experiments were performed for studying both the use of various types of calcium carbonate, i.e. calcined kaolin, in-situ PCC and in-line PCC as a filler, and the effects of adding starch and CMC to the milk of lime prior to in-line carbonation or crystallization of the PCC. The main objective of the second series of experiments was to find out if the strength properties of the paper provided with PCC could be improved. For the majority of the experiments the PCC concentration was set to 7.5%.

The third series of experiments were performed such that, first, a reference point was produced by manufacturing a hand sheet with the pilot machine's standard recipe for modeling the surface layer of an uncoated multilayer liquid packaging board, and a number of variables were measured or determined. The recipe of experiment 9 for defining the reference point included 5% calcined kaolin as the filler for improving the whiteness and opacity of the hand sheet.

After attaining the reference point in experiment 9, i.e. in experiment 10, the calcined kaolin was replaced by 5% offline-PCC, i.e. PCC produced at a satellite plant and delivered to the paper mill as a slurry. Offline-PCC is comparable to a prior art application of an in-situ produced PCC solution mixed to the headbox feed stock.

In experiment 11 the PCC was produced in-line to the paper making stock or furnish such that its concentration was 5%. This way a comparison between the traditional PCC application method and the in-line-PCC application method could be made.

In experiment 12 the PCC was produced in-line to the paper making stock such that its concentration was 7.5%. This experiment was used as a reference experiment for a later experiment 13 where starch and CMC were mixed with the milk of lime prior to the carbonation of PCC.

In experiment 13 the PCC was produced in-line to the paper making stock such that its concentration was 7.5%. However, prior to the carbonation of the PCC in the presence of fibers, 3% cationic starch with 3% CMC was mixed with the calcium hydroxide, i.e. milk of lime. The starch and CMC percentages refer to total filler volume.

For each experiment 9-13 pulp of dry matter content of 0.5% was used. The suspension containing milk of lime (in experiment 13) was injected among the pulp with a syringe just before the carbonation process. The carbonation and mixing was completed with a Quantum Mark IV laboratory mixer. Hand sheets were prepared by means of a pilot paper machine by using a moving belt former (MBF), which is designed to simulate the water removing conditions of a paper machine while forming the sheet. Hand sheets were pressed and drum dried according to the SCAN-C 26:76 standard. The target grammage of the prepared hand sheets was 65 g/m$^2$ and the size of the sheets 190 mm×190 mm. Scanning Electron Microscope (SEM) images of the produced hand sheets were also taken for comparison.

Table 4 compares the properties of hand sheets of experiments 10 to 12 to that of experiment 9 by using a few more additional properties. In table 4 '+++' designates improvement of 20% or more, '++' improvement between 10 and 20%, '+' improvement between 3 and 10%, and '0' values between −3% and +3%. The minuses designate corresponding reductions in the value of the property.

TABLE 4

| Measured Feature | 5% off-line PCC (exp. 10) | 5% in-line PCC (exp. 11) | 7.5% in-line PCC (exp. 12) | 7.5% in-line PCC + 3% cationic starch + 3% CMC (exp. 13) |
|---|---|---|---|---|
| Opacity | O | O | O | O |
| Stretch | O | O | O | + |
| Tensile index | O | O | − − | + |
| Tensile stiffness index | − | O | − | − |
| E-modulus | − | + | − | O |
| Tensile energy absorption index | − | O | − − | + |
| Tear strength | + + | + | + | + |
| Tear index | + | + | O | + |
| Burst strength | + | + | − | + + |
| Burst index | + | O | − | + + |

The results are similar to those discussed in connection with table 3. For instance, the stretch, tensile index, tensile energy absorption index, tear strength and tear index are raised 3-10% compared to the reference point (experiment 9), and burst strength and burst index 10-20% compared to the reference point. In many properties, especially in burst strength and index and tensile index a clear improvement may also be seen when compared to the hand sheets of other experiments. Again, it may be seen that the opacity values have remained substantially the same irrespective of the fact that in experiments 10-13 PCC was used. These results, too, encourage the paper manufacturer to increase the use of PCC as long as it is carbonated in the presence of fibers and retention/strength enhancing polymer as, when comparing experiments 12 and 13 it may be seen that, in experiment 13, there is room for allowing the reduction in the strength values in favour of higher PCC usage.

FIG. 1 illustrates a 10000* magnification SEM top image of the hand sheet of example 2 experiment 8. In other words, the PCC was carbonated in the presence of both the furnish and a mixture of 10% cationic starch among milk of lime. The SEM image shows in the suspension a somewhat sticky network that seems to adhere to any solid particle available in the suspension.

Figure 2:
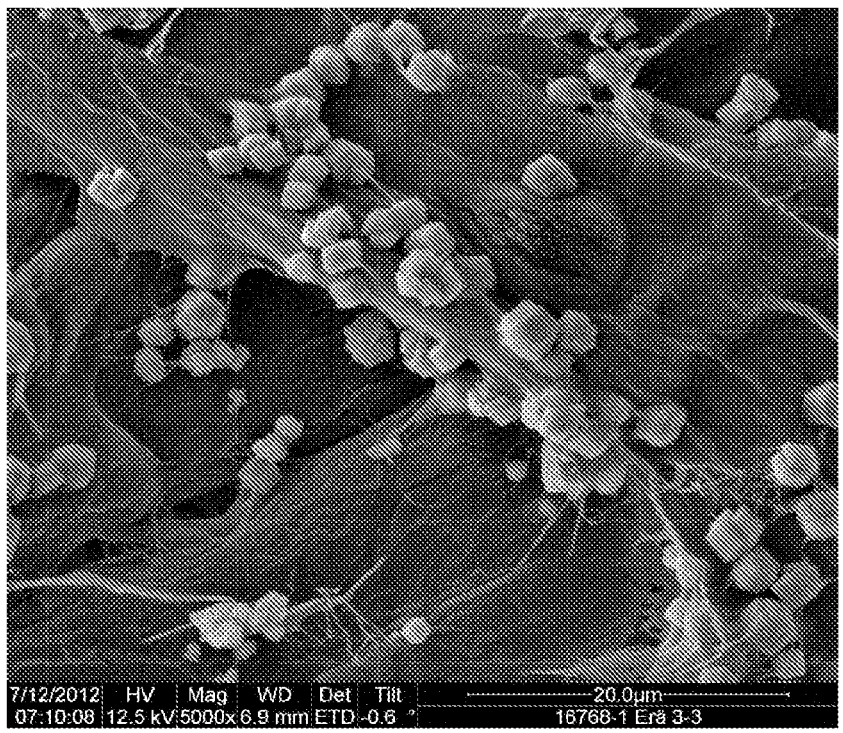
FIG. 2 illustrates a SEM image of a hand sheet manufactured by using in-line PCC.
Figure 3:
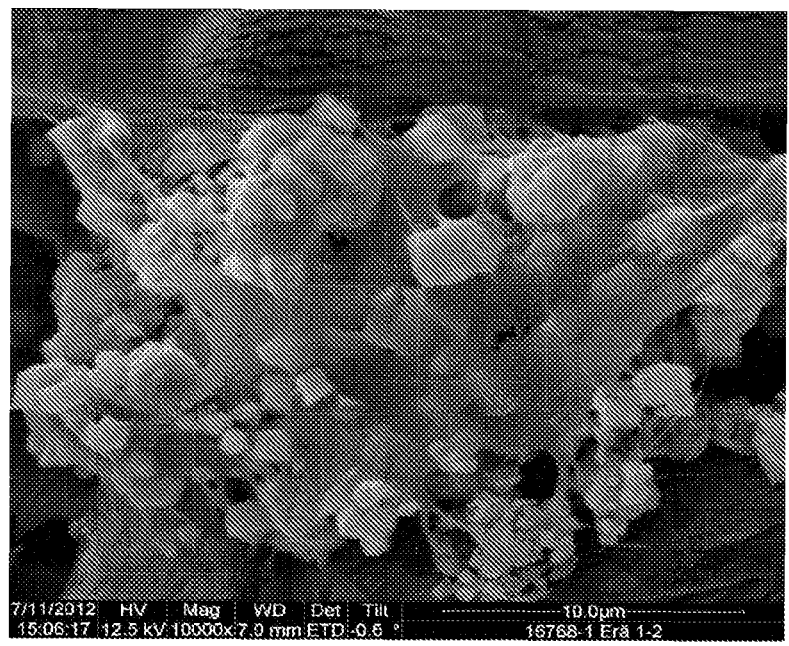
FIG. 3 illustrates another SEM image of a hand sheet manufactured by using on-line PCC and starch.

To study what the network is, some hand sheets were prepared so that the origin of this far unknown veil or glue-like substance could be studied in more detail. The idea was to find out whether the veil was related to the starch that is typically used as dry strength improvement. The experiment was carried out, firstly, by preparing a hand sheet of a batch without starch of 7.5% calcium hydroxide mixed into the diluted pulp, and secondly, by preparing a hand sheet of a batch of 20 kg/tin cationic starch and 7.5% calcium hydroxide mixed into the diluted pulp. The precipitation of PCC was carried out after feeding of $CO_2$ to the pulp with a Quantum laboratory mixer. The results were examined from SEM-images shown in FIGS. 2 and 3. It is clear that the origin of the glue like film on the PCC particles is coming from the starch, as FIG. 2 shows very clearly what the PCC particles and the fiber with its fibrils look like without the presence of starch and in Figure the glue like film is clearly visible. The glue like film was perceived as a positive phenomenon as it seemed to firmly attach the filler particles to the fiber.

With in-line-PCC technology, the filler particles attach firmly around the fiber fines, while with offline-PCC, the particles lay loosely between the fibers and fines. This is likely one of the reasons why in-line-PCC overall has improved the elastic-modulus and tensile stiffness values.

The performed experiments further showed that the tensile strength of the paper increased significantly when the strength enhancing polymer was added in the milk of lime and the carbonation was performed in the presence of fibers. It is believed that the PCC crystals adhere better to the fibers if the strength enhancing polymer is present when the PCC crystals are formulated. The reason behind this belief is that the polymer chains that have a high specific surface area act as mediators between the PCC crystals and the fibers. When both fibers and polymers are present in the carbonation, the PCC crystals meet the polymer chains, adhere to them and soon after that the polymer chains meet fibres and adhere thereto. Though a bond will be created between a fiber and a PCC crystal the bonding between the fibre and the crystal is stronger due to the presence of polymer.

A further assumption, without binding to any theory, is that while the milk of lime and strength enhancing/retention chemicals are introduced together to the stock or furnish the strength enhancing/retention chemical molecules adhere to the milk of lime particles, whereby the PCC crystals are firmly attached to the strength enhancing/retention chemical molecules, which, when meeting a fibre attach to such. Naturally, since fibers are already present, the strength enhancing/retention chemical molecules attached to the milk of lime particles may adhere to fibers already before any reaction between milk of lime and $CO_2$.

Another assumption, without binding to any theory, is that while the milk of lime and strength enhancing/retention chemical are introduced together to the stock or furnish the strength enhancing/retention chemical itself and the, at that stage very small, PCC crystals adhered to the strength enhancing/retention chemical are able to attach, due to their small size, to the fibrils of the fibers. This kind of early attaching to fibrils and fibers makes it possible to create a greater number of bonds therebetween whereby the strength properties of the end product are higher.

Thus it is obvious that when the carbonation of PCC is performed in the presence of at least one strength enhancing/retention chemical, the PCC crystals adhere to the network, and form flocs. In such a case the flocs are compact and leave less room, i.e. free surface area for bonding to the fibres when the PCC—strength enhancing/retention chemical mixture is mixed with fibers. It is, thus, natural that when the carbonation of PCC is performed in the presence of both fibres and strength enhancing/retention chemical, both the PCC crystals and fibres adhere to the network, and form flocs, whereby the retention between the fibres and the PCC is stronger.

With regard to mill-scale applications the in-line production of PCC is preferably, but not necessarily, performed by following the main teachings of WO-A2-2009/103854. In other words, injection mixers are used for injecting the milk of lime and at least one strength enhancing/retention chemical to the furnish. The main teaching of the present invention is that the carbonation of PCC takes place in the presence of both fibers and the at least one strength enhancing/retention chemical. Thus, it is considered important that both the at least one strength enhancing/retention chemical and the milk of lime are introduced at least simultaneously into the pipeline taking the furnish towards the headbox of the paper making machine. Such a pipeline should be understood broadly as one option may be to take a sideflow from the main stock line and carbonate the PCC in the sideflow, and later on mix the sideflow with furnish in the main line taking the furnish to the headbox. For such purposes, an injection mixer, like those discussed in FI-B1-116473, EP-B1-1064427 and EP-B1-1219344 may be used. In other words, the milk of lime may be injected as one chemical and the at least one strength enhancing/retention chemical as the other chemical via the same injection mixer. It is also possible to arrange the chemical feed via two separate mixers whereby the mixers are arranged one after another as discussed in more detail in CA-2787347. However, it is a preferred option to allow the at least one strength enhancing/retention chemical and the milk of lime get mixed prior to their introduction to the furnish. Such a mixing may take place in an injection mixer, like one of those discussed in CA-2541528 or FI-B1-116473. The mixing of milk of lime with the at least one strength enhancing/retention chemical may also be performed upstream of the introduction, i.e. for instance upstream of the introduction means, preferably upstream of an injection mixer. Also the gas containing $CO_2$ may be injected by means of an injection mixer, though also other means for providing the furnish with $CO_2$ may be used. In case an injection mixer is used for feeding $CO_2$, an option is to inject the $CO_2$ together with the mixture of the at least one strength enhancing/retention chemical and the milk of lime or, in case the teachings of CA-2787347 are used, together with one of the at least one strength enhancing/retention chemical and the milk of lime. In general, the introduction of $CO_2$ in the furnish may take place either before, simultaneously with or after the introduction of the at least one strength enhancing/retention chemical and the milk of lime to the furnish. With regard to all cases discussing the use of an injection mixer it should be understood that the injection mixer injects the chemical or chemical mixture to the furnish by means of an injection liquid that may be a side flow taken from the furnish, a filtrate taken from the paper or board machine or any other applicable liquid just to name a few examples without any intention to limit the injection liquid to only the listed examples.

Figure 4:
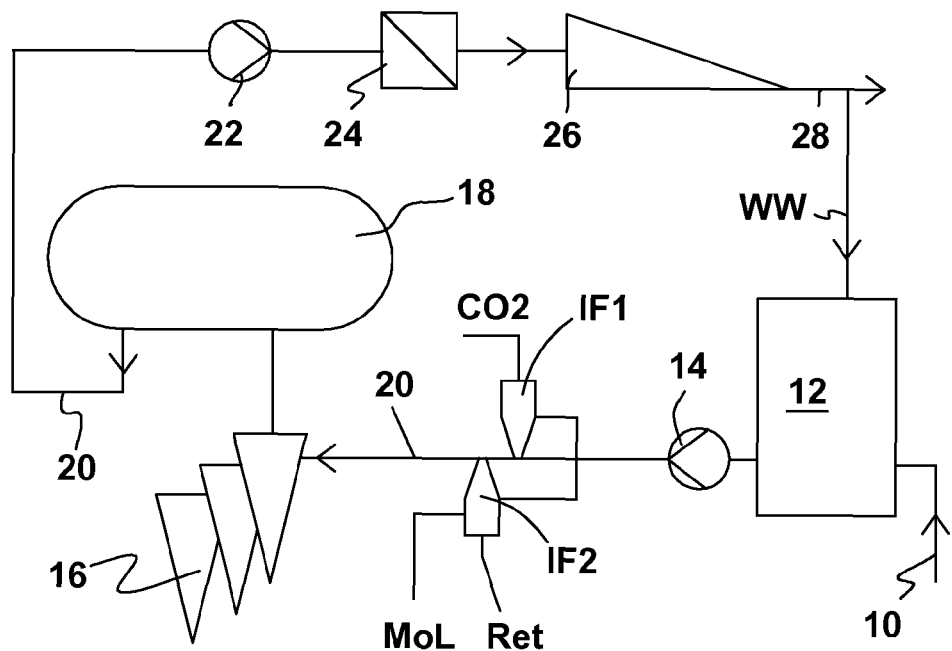
FIG. 4 illustrates a short circulation of a fiber web machine in accordance with a preferred embodiment of the present invention.

FIG. 4 illustrates as a preferred embodiment of the present invention a short circulation of a fiber web machine. The short circulation comprises a mixing tank 12 to which various fibrous components used in the fiber web manufacture making are introduced. From the mixing tank or chest 12 the furnish or stock is taken to a pipeline 20 leading to the headbox 26 of the fiber web machine, and pumped by a pump 14 first to a vortex cleaning plant 16, then to a degassing vessel 18 and thereafter to the headbox feed pump 22, which feeds the stock via a headbox screen or machine screen 24 to the headbox from which the stock is taken on the wire of the fiber web machine 28. The Figure also shows how the filtrate, i.e. so called white water (WW), from the fiber web machine is recirculated to the mixing chest 12. The shirt circulation comprises further, in accordance with this embodiment, two injection mixer stations (one or several injection mixers introducing the same chemical/s and arranged on substantially the same circumference of the pipeline) IF1 and IF2 for introducing, on the one hand, $CO_2$ and on the other hand both milk of lime (MoL) and strength enhancing/retention chemical (Ret) to the stock flowing in the pipeline 20 between the feed pump 14 and the vortex cleaning plant 16. As shown in the Figure both injection mixers use as the injection liquid the stock taken from pipeline 20.

There is a number of things that has to be taken into account when considering the teachings of the above. Firstly, it should also be understood that the $CO_2$ may be introduced either to the stock earlier, i.e. it may be mixed with the stock components in the chest, or together with the milk of lime and the strength enhancing/retention chemical, or after the injection of the milk of lime and the strength enhancing/retention chemical. As to the distance between the introduction of the $CO_2$ (IF1), and the MoL and the strength enhancing/retention chemical (IF2) the teachings of the Wetend Technologies' patent document WO-A2-2011050205 may be applied here. In other words, preferably the distance between the pair of mixers or mixer stations IF1 and IF2 is of the order of 0.05 to 8 meters, more preferably 0.05 to 5 meters most preferably 0.1 to 2 meters. Preferably the mixers or mixer stations positioned near each other as described above form one or more mixer pairs so that the upstream injection mixer of each mixer pair introducing the second flow is arranged in a location the position of which on the circumference of the process pipe deviates at most 20 degrees, more preferably 10 degrees (measured in the direction of the circumference of the pipe) from the level passing through axis of the process pipe onto which the downstream mixer is located. Thus, the downstream injection mixer is in a way located in a sector of 40 degrees, preferably 20 degrees, in the longitudinal direction of the process pipe, on the diameter of which sector the upstream mixer is located.

Secondly, the exemplary FIG. 4 shows the short circulation in its full width, i.e. including all major components there may be. However, on the one hand, there are short circulations where the vortex cleaning plant and/or the degassing vessel are missing, and, on the other hand, a short circulation may include, for adding various fiber web making chemicals, a number of mixers, which are missing from FIG. 4. In any case, the present invention covers all such variations of the short circulation of the fiber web machine as long as the milk of lime is introduced into the pipeline after the feed pump 14. Thirdly, also as mentioned earlier, the chemicals, here $CO_2$, MoL and Ret may be injected to the stock without using a specific injection liquid. And finally, the fiber web should be understood in its broadest sense to contain paper, tissue, board, fiber board, i.e. all such fibrous web products that utilize PCC for one reason or another. In other words, the PCC may be utilized not only for increasing opacity or bulk but also be used as a fire-retardant.

A worthwhile further option is to use the mixture of the at least one strength enhancing/retention chemical and the milk of lime to be used as the injection liquid in the injection of $CO_2$ in the furnish. With regard to the injection mixers it should be understood that there may be several injection mixers on the same perimeter in communication with the pipeline taking the furnish to the headbox of a paper or board machine. In such a case the assembly or set of mixers is called a mixing station. In similar manner, in case the teachings of CA-2787347 are applied, the injection mixing stations may be arranged one after another on the pipeline.

While the invention has been discussed and described above in view of a few preferred embodiments, it has to be understood that the above description should by no means be considered as limiting the scope of the invention from what has been disclosed in the appended claims. Also it has to be understood that various specific details discussed in connection with a certain embodiment may be used in connection with other embodiments of the invention whenever practically possible.

The invention claimed is:

1. A method of providing fiber web making furnish with filler comprising the steps of:
    a) providing a pipeline leading to a headbox of a fiber web machine with furnish,
    b) making the furnish comprising fiber web making fibers flow towards the headbox,
    c) introducing at least one of a retention and strength enhancing chemical simultaneously together with milk of lime to the furnish,
    d) providing the furnish with carbon dioxide ($CO_2$) before, during or after step c), and
    e) allowing a carbonation reaction between milk of lime and carbon dioxide to proceed, for precipitating calcium carbonate, in the presence of both fiber web making fibers and the at least one of the retention and strength enhancing chemical.

2. The method as recited in claim 1, wherein step d) includes injecting the at least one retention and strength enhancing chemical and milk of lime to the furnish.

3. The method as recited in claim 1, wherein step d) includes injecting the carbon dioxide ($CO_2$) to the fiber web making furnish.

4. The method as recited in claim 1 further comprising using the furnish with the precipitated calcium carbonate in the manufacture of a fiber web.

5. The method as recited in claim 1, wherein the at least one of the retention and the strength enhancing chemical is one or more of natural starch, non-ionic, anionic, cationic or amphoteric starch, cooked starch, carboxymethyl cellulose, guar gum, PAAE (Polyamidoamine-epichlorohydrin), c-PAM (cationic polyacrylamine polymer), a-PAM (anionic PAM), silicate, nanoparticles, copolymer of polyvinylamine and polyacrylate (PA), and anionic copolymers of acrylamide.

6. A method of producing a fiber web having precipitated calcium carbonate as a filler, comprising:
    providing a fibrous suspension to a mixing tank in a fiber web machine;
    sending the fibrous suspension from the mixing tank towards a headbox in the fiber web machine via a pipeline system;
    introducing carbon dioxide into the fibrous suspension in the pipeline system upstream of the headbox;
    introducing simultaneously at least one of a strength enhancing chemical or a retention chemical and a milk of lime to the fibrous suspension in the pipeline system upstream of the headbox;
    reacting the milk of lime with the carbon dioxide, the reaction involves a carbonation process that takes place in the pipeline system and in the presence of the fibrous suspension and the strength enhancing chemical or retention chemical; and
    producing a precipitated calcium carbonate from the carbonation process;
    feeding the fibrous suspension that includes the precipitated calcium carbonate and the at least one of the strength enhancing chemical or the retention chemical to the headbox; and
    producing a fiber web having the precipitated calcium carbonate in the fiber web as a fiber filler.

7. The method of claim 6, wherein the carbon dioxide can be introduced to the fibrous suspension before the fibrous suspension enters the mixing tank, and in the pipeline before, together with, or after the introduction of the strength enhancing chemical or the retention chemical and the milk of lime.

8. The method of claim 6, wherein the milk of lime and the strength enhancing chemical or retention chemical are mixed before being introduced to the fibrous suspension.

9. The method of claim 6, wherein the carbonation process occurs after the milk of lime and the strength enhancing chemical or retention chemical are introduced to the fibrous suspension.

10. The method of claim 6, wherein the strength enhancing chemical or the retention chemical is one or more of a natural starch, non-ionic, anionic, cationic or amphoteric starch, cooked starch, carboxymethyl cellulose, guar gum, PAAE (Polyamidoamine-epichlorohydrin), c-PAM (cationic polyacrylamine polymer), a-PAM (anionic PAM), silicate, nanoparticles, copolymer of polyvinylamine and polyacrylate (PA), and anionic copolymers of acrylamide.

11. The method of claim 6, wherein the carbon dioxide, the milk of lime, and the strength enhancing chemical or the retention chemical are introduced into the fibrous suspension via at least one injection mixer.

12. A method of producing precipitated calcium carbonate in an in-line fiber web making process, comprising:
    providing a fiber stock to a fiber web making system;
    injecting together at least one strength enhancing chemical or retention chemical and milk of lime;
    after the injection, inducing a carbonation reaction in the milk of lime by introducing carbon dioxide gas or carbon dioxide containing gas to the fiber stock; and
    producing precipitated calcium carbonate as a product of the carbonation reaction in the mixed stock, wherein the precipitated calcium carbonate is produced and retained in the fiber stock before the fiber stock enters a wire in the fiber web making system.

13. The method of claim 12 further comprising forming a fiber web using the fiber stock after carbonation, and retaining the precipitated calcium carbonate as a fiber filler in the fiber web.

14. The method of claim 12, wherein the at least one strength enhancing chemical or retention chemical and the milk of lime are introduced by at least one injection mixer.

15. The method of claim 12, wherein the pure carbon dioxide gas or carbon dioxide containing gas is introduced to the fiber stock using at least one injection mixer.

* * * * *